United States Patent
Qiao et al.

(10) Patent No.: US 10,297,855 B2
(45) Date of Patent: May 21, 2019

(54) RECHARGEABLE MULTI-CELL BATTERY

(71) Applicant: NUtech Ventures, Lincoln, NE (US)

(72) Inventors: Wei Qiao, Lincoln, NE (US); Taesic Kim, Lincoln, NE (US); Liyan Qu, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 1251 days.

(21) Appl. No.: 13/904,782

(22) Filed: May 29, 2013

(65) Prior Publication Data

US 2013/0320772 A1    Dec. 5, 2013

Related U.S. Application Data (60) Provisional application No. 61/652,398, filed on May 29, 2012.

(51) Int. Cl.
*H01M 10/04* (2006.01)
*H01M 10/42* (2006.01)
*H02J 7/00* (2006.01)

(52) U.S. Cl.
CPC ....... *H01M 10/04* (2013.01); *H01M 10/4207* (2013.01); *H02J 7/0021* (2013.01); *H02J 7/0024* (2013.01); *H01M 2010/4271* (2013.01); *Y02T 10/7055* (2013.01); *Y10T 307/724* (2015.04); *Y10T 307/729* (2015.04); *Y10T 307/735* (2015.04)

(58) Field of Classification Search
CPC .................................................. H02J 7/0024
See application file for complete search history.

(56) References Cited

U.S. PATENT DOCUMENTS

| | | | |
|---|---|---|---|
| 4,455,523 A | 6/1984 | Koenck | |
| 4,553,081 A | 11/1985 | Koenck | |
| 5,700,598 A | 12/1997 | Denis et al. | |
| 5,744,936 A * | 4/1998 | Kawakami | H02J 7/0026 320/120 |
| 6,017,654 A | 1/2000 | Kumta et al. | |

(Continued)

OTHER PUBLICATIONS

Kim et al., "Series-connected self-reconfigurable multicell battery," *Proc. 2011 Applied Power Electronics Conference & Exposition*, Mar. 6-10, 2011, pp. 1382-1387.

(Continued)

*Primary Examiner* — Fritz M Fleming
(74) *Attorney, Agent, or Firm* — Fish & Richardson P.C.

(57) ABSTRACT

A method for power management of a multi-cell battery includes identifying a desired power value and voltage value, determining a battery voltage value and a battery current value for a battery, determining a number of battery banks from a plurality of battery banks to use for the battery, where each battery bank includes one or more battery cells (or battery modules), checking availability of each of the one or more battery cells (or battery modules), selecting one or more battery banks from the plurality of battery banks, where the selection of a battery bank is based on the availability of the battery cells (or battery modules) included in the battery pack, and a quantity of the selected battery banks is equal to the determined number of battery banks, and connecting the available battery cells (or battery modules) in the selected one or more battery banks to form the battery.

28 Claims, 7 Drawing Sheets

(56) References Cited

U.S. PATENT DOCUMENTS

| | | | |
|---|---|---|---|
| 6,211,719 B1 * | 4/2001 | deBrigard | H03K 17/6872 |
| | | | 326/30 |
| 6,322,928 B1 | 11/2001 | Thackeray et al. | |
| 2005/0068005 A1 | 3/2005 | Yamashita | |
| 2006/0077603 A1 * | 4/2006 | Kim | H02J 7/0026 |
| | | | 361/90 |
| 2009/0289598 A1 * | 11/2009 | Tsukamoto | H01M 10/441 |
| | | | 320/118 |
| 2012/0091963 A1 * | 4/2012 | Vance | H02J 7/0026 |
| | | | 320/118 |
| 2012/0274140 A1 * | 11/2012 | Ganor | H02J 7/0011 |
| | | | 307/71 |

OTHER PUBLICATIONS

Kim et al., "A multicell battery system design for electric and plug-in hybrid electric vehicles," *Proc 2012 IEEE International Electrical Vehicle Conference*, Mar. 4-8, 2012, 7 pages.

* cited by examiner

RECHARGEABLE MULTI-CELL BATTERY

CROSS-REFERENCE TO RELATED APPLICATIONS

This application claims priority under 35 U.S.C. § 119(e)(1), to U.S. Provisional Application Ser. No. 61/652,398, filed on May 29, 2012, the entire contents of which are incorporated herein.

FEDERALLY SPONSORED RESEARCH OR DEVELOPMENT

This invention was made with government support under CAREER Award ECCS-0954938, awarded by the United States National Science Foundation, and Agreement No. DTFH61-10-H-00003, awarded by the United States Federal Highway Administration. The government has certain rights in the invention.

TECHNICAL FIELD

This specification generally describes systems and processes for power management of a rechargeable multi-cell battery.

BACKGROUND

Many types of electrical and electronic based systems may use rechargeable multi-cell batteries. These systems can include, for example, renewable energy systems, electric vehicles, hybrid electric vehicles, and commercial electronics. Many battery cell technologies (e.g., lead-acid, nickel-cadmium (NiCd), nickel metal hydride (NiMH), lithium-ion, Lithium Iron Phosphate (LiFePO4) and nano Lithium Titanate Oxide (nLTO)) can provide the energy storage needed for the systems.

Several design deficiencies in currently available fixed configuration rechargeable multi-cell battery systems have impeded the use of rechargeable multi-cell batteries for large-scale energy storage in may types of electrical systems. For example, implementations of rechargeable multi-cell batteries can use a fixed configuration to connect multiple cells or modules in series and parallel during operation of the electrical system in order to provide the system with the required voltage and current. The use of a fixed configuration for the cells of the battery may result in low reliability and fault tolerance during abnormal operating conditions of the battery, such as high temperature, overcharge, over-discharge, or over-current. When using a fixed configuration, failure of any single cell or module in the multi-cell battery during operation of the electrical system may result in the cutoff or failure of the entire multi-cell battery. In another example, the use of a fixed configuration may not provide for efficient utilization of cell state variations, which can result in less than optimal energy conversion by the multi-cell battery. In another example, the use of a fixed configuration may not allow for flexible dynamic power management, which can result in less than optimal performance of the electrical system using the battery.

In some implementations, an electrical system that uses a rechargeable multi-cell battery can include one or more safety circuits. The safety circuits can monitor the temperature, voltage, and current of each battery cell, identifying faulty or abnormal cells in the multi-cell battery, resulting in the protection of the battery from high temperature, overcharge, over-discharge, over-current, and the failure of any of the battery's cells or modules. The safety circuits can protect battery cells from operating under abnormal conditions. The safety circuits, however, will disconnect the entire rechargeable multi-cell battery from the electrical system when any single cell in the battery operates in any one of the abnormal conditions, as the safety circuit cannot provide an effective reconfiguration topology for the multi-cell battery that would make use of the remaining functional battery cells.

In some implementations, an electrical system that uses a rechargeable multi-cell battery can include one or more cell balancing circuits. Because cell unbalance or state variations in a multi-cell battery can occur, in the fixed-configuration multi-cell battery only a part of the total capacity of the multi-cell battery can be utilized, resulting in a reduction in the useable capacity, and operating time and lifespan of the multi-cell battery. For example, as a solution to cell state variations in a multi-cell battery, cell balancing circuits can use electronic converters to transfer charge from one battery cell to another battery cell during the operation of the battery in the electrical system effectively balancing the state of charge (SOC) of the battery cells in the cell string. Cell balancing circuits transfer charges between adjacent battery cells using small currents, which can lead to slow and less than optimal battery cell balancing in the multi-cell battery. In addition, cell balancing circuits may use dissipative resistors resulting in system energy loss, may increase the cost and volume of a battery system due to the need for additional circuitry, and may only be used with multi-cell batteries where the multiple battery cells are connected in series.

In many cases, cell balancing circuits cannot provide the needed reconfiguration of the battery cells in a multi-cell rechargeable battery pack when faulty cells are detected. In some implementations, reconfigurable multi-cell battery topologies can include complex cell switching circuits that provide the power management needed for a rechargeable multi-cell battery in an electrical system. These reconfigurable multi-cell battery topologies may be too complex for battery systems that include a large number of battery cells due to the high complexity of the cell switching circuits.

SUMMARY

In some implementations, a power management system for a rechargeable multi-cell battery pack can include a switching circuit that connects multiple battery cells or battery modules in series and in parallel to form a reconfigurable battery pack during electrical system operation that provides the required voltage and current, respectively, for the electrical system. A battery module in the battery pack can include multiple battery cells connected in series and/or in parallel. The switching circuit can include high-efficiency controllable power semiconductor devices along with the gate drive circuits for the devices, where the devices function as switches. Each battery cell or module is associated with one or more switches that can be turned on or off to independently control the charge, discharge, and cutoff state of the battery cell or module.

The power management system of the reconfigurable multi-cell battery pack can also include a controller that provides the on or off state for each switch. The controller can further include one or more processors that can be programmed to receive a set of real-time operating data (e.g., values for the voltage, current, and temperature of a battery cell or module) measured at each battery cell or module. The one or more processors can be programmed to use the received data in order to determine the condition (e.g., state of charge (SOC), state of health (SOH)) of the battery cell or module. The one or more processors can also be programmed to determine, in real time, an operating mode for each battery cell or module based on the determined condition of the battery cell or module, and the power demand from the load connected to the battery pack or the power supplied by the source connected to the battery pack. The battery management system can also include a signal generator that generates control signals for the gate drive circuits of the controllable power semiconductor devices, where the control signals turn the devices on or off, resulting in the switching of the corresponding battery cells or modules into a pre-determined mode of operation.

In general, one innovative aspect of the subject matter described in this specification may be embodied in systems and methods used for identifying a desired power value and a desired voltage value, determining, based on the desired power value and the desired voltage value, a battery voltage value and a battery current value for a battery, determining, based on the battery voltage value and the battery current value, a number of battery banks from a plurality of battery banks to use for the battery, where each battery bank includes one or more battery cells, checking, for each battery bank in the plurality of battery banks, availability of each of the one or more battery cells included in the battery bank, selecting one or more battery banks from the plurality of battery banks, where the selection of a battery bank is based on the availability of the battery cells included in the battery pack, and a quantity of the selected battery banks is equal to the determined number of battery banks, and connecting the available battery cells in the selected one or more battery banks to form the battery.

Other implementations of these aspects include corresponding systems and computer programs, configured to perform the actions of the methods, encoded on computer storage devices.

These and other implementations may each optionally include one or more of the following features. For instance, the desired power value and the desired voltage value are for a load condition, and the method further includes determining that the load condition has changed, and identifying, based on the change in the load condition, an updated desired power value and an updated desired voltage value. The desired power value and the desired voltage value are for a source condition, and the method further includes determining that the source condition has changed, and identifying, based on the change in the source condition, an updated desired power value and an updated desired voltage value. The method further includes determining that a predefined time duration has ended, and identifying, based on determining that a predefined time duration has ended, an updated desired power value and an updated desired voltage value. Selecting one or more battery banks from the plurality of battery banks includes calculating, for each battery bank in the plurality of battery banks, the state of charge (SOC) and the state of health (SOH) of the battery bank, determining, based on the calculated SOC and SOH for each battery bank in the plurality of battery banks, a pool of unselected battery banks, selecting a particular battery bank from the pool of unselected battery banks, where the battery bank with the highest SOC and SOH is selected as the particular battery bank when the battery is discharged to supply a load, and the battery bank with the lowest SOC and SOH is selected as the particular battery bank when the battery is charged from a source.

In general, another innovative aspect of the subject matter described in this specification may be embodied in systems that include a battery pack including a plurality of battery cells, where the battery cells are arranged in one or more battery banks, a cell switching circuit including one or more switches, the cell switching circuit configured to control connecting each of the plurality of battery cells to form one or more battery banks, and configured to control disconnecting each of the plurality of battery cells from a battery bank, and a battery management system configured to provide control signals to the cell switching circuit that control the one or more switches included in the cell switching circuit.

These and other implementations may each optionally include one or more of the following features. For instance, the cell switching circuit is further configured to control disconnecting and connecting each of the one or more battery banks from the battery. The battery cells are connected in parallel to form the battery bank and the battery banks are connected in series to form the battery. The one or more switches included in the cell switching circuit are metal-oxide-semiconductor field-effect transistors (MOSFETs). A bipolar junction transistor (BJT) provides a gate signal to a MOSFET to control turning the MOSFET on or off to connect or disconnect, respectively, a battery cell in a battery bank. An opto-coupler provides a gate signal to a MOSFET to control turning the MOSFET on or off to connect or disconnect, respectively, a battery cell in a battery bank. The battery management system includes a sensing and monitoring circuit configured to monitor current state values for each of the plurality of battery cells, a control and protection module configured to determine, based on the current state values for each of the plurality of battery cells, that a particular battery cell should be disconnected from a particular battery bank or connected to a particular battery bank for charging or discharging, and a gate signal generation module configured to generate one or more control signals for use by the cell switching circuit when disconnecting the particular battery cell from the particular battery bank or connecting the particular battery cell to the particular battery bank for charging or discharging. The battery management system further includes a model-based state of charge (SOC) and state of health (SOH) tracking module configured to track the SOC and SOH of each of the plurality of battery cells. Determining that a particular battery cell should be connected to or disconnected from a particular battery bank is based on the SOC and the SOH for the particular battery cell.

In general, another innovative aspect of the subject matter described in this specification may be embodied in systems that include a battery pack including a plurality of battery modules, where a battery module includes multiple battery cells connected in series or in parallel or in series and in parallel, and the plurality of battery modules are arranged in one or more battery banks, a cell switching circuit including one or more switches, the cell switching circuit configured to control connecting each of the plurality of battery modules to form one or more battery banks, and configured to control disconnecting each of the plurality of battery modules from a battery bank, and a battery management system configured to provide control signals to the cell switching circuit that control the one or more switches included in the cell switching circuit.

These and other implementations may each optionally include one or more of the following features. For instance, the cell switching circuit is further configured to control disconnecting and connecting each of the one or more battery banks from the battery. The battery modules are connected in parallel to form the battery bank and the battery banks are connected in series to form the battery. The one or more switches included in the cell switching circuit are metal-oxide-semiconductor field-effect transistors (MOSFETs). A bipolar junction transistor (BJT) provides a gate signal to a MOSFET to control turning the MOSFET on or off to connect or disconnect, respectively, a battery module in a battery bank. An opto-coupler provides a gate signal to a MOSFET to control turning the MOSFET on or off to connect or disconnect, respectively, a battery module in a battery bank. The battery management system includes a sensing and monitoring circuit configured to monitor current state values for each of the plurality of battery modules, a control and protection module configured to determine, based on the current state values for each of the plurality of battery modules, that a particular battery module should be disconnected from a particular battery bank or connected to a particular battery bank for charging or discharging, and a gate signal generation module configured to generate one or more control signals for use by the cell switching circuit when disconnecting the particular battery module from the particular battery bank or connecting the particular battery module to the particular battery bank for charging or discharging. The battery management system further includes a model-based state of charge (SOC) and state of health (SOH) tracking module configured to track the SOC and SOH of each of the plurality of battery modules. Determining that a particular battery module should be connected to or disconnected from a particular battery bank is based on the SOC and the SOH for the particular battery module.

Particular implementations of the subject matter described in this specification may be provided so as to realize one or more of the following advantages. A battery management system can dynamically reconfigure the rechargeable cells in a battery pack based on the dynamic load and/or storage demands of the electrical system and the condition of each battery cell or module in the battery pack. The battery management system can allow the battery pack to self-heal from the failure or abnormal operation of single or multiple battery cells, to self-balance from battery cell or module state variations, and to self-optimize in order to achieve optimal energy conversion efficiency based on the load and/or storage demands for the battery pack. The proposed switching circuit topology in the battery management system results in a minimal number of switches, reducing the cost, complexity, power requirements, and amount of control needed by the battery management system in order to dynamically reconfigure the rechargeable cells in the battery pack. Cell switching circuits can include power semiconductor switches where a switch can switch a battery cell in and out of a battery system included in a battery pack. Gate drive circuits can be designed to efficiently control the switching of each of the power semiconductor switches in a cell switching circuit.

The details of one or more implementations of the subject matter described in this specification are set forth in the accompanying drawings, and the description, below. Other features, aspects and advantages of the subject matter will be apparent from the description and drawings, and from the claims.

BRIEF DESCRIPTION OF DRAWINGS

Like reference symbols in the various drawings indicate like elements.

DETAILED DESCRIPTION

In the following text, a detailed description of examples will be given with reference to the drawings. It should be understood that various modifications to the examples may be made. In particular, elements of one example may be combined and used in other examples to form new examples.

Figure 1:
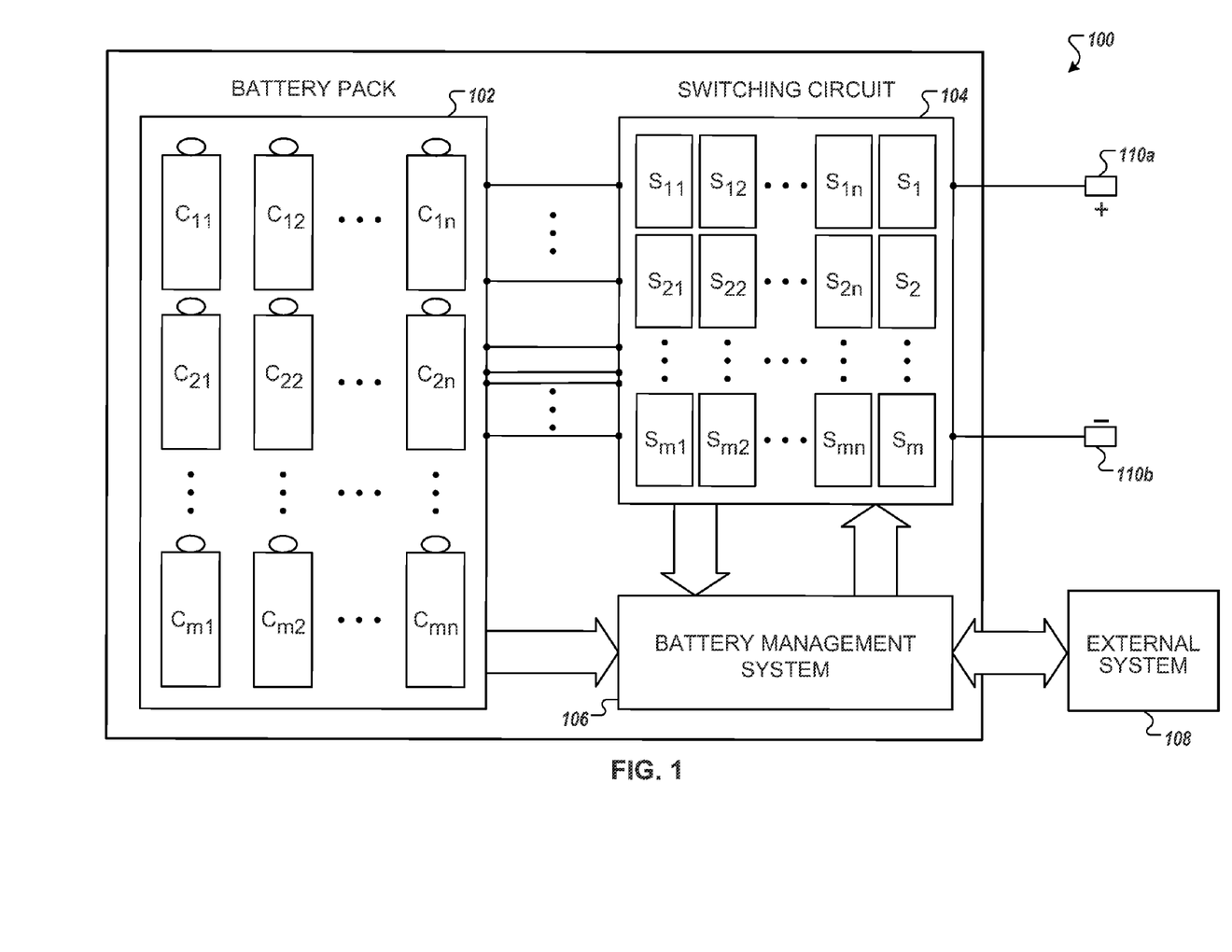
FIG. 1 is a block diagram of an example power management system that includes a switching circuit and a battery management system for a rechargeable multi-cell battery pack.

FIG. 1 is a block diagram of an example power management system 100 that includes a switching circuit 104 and a battery management system 106 for a rechargeable multi-cell battery pack 102. The battery pack 102 includes battery cells $G_{11}$ to $C_{mn}$. In the example of FIG. 1, the battery cells are arranged in the battery pack 102 as n number of battery cells in m number of banks. In some cases, the battery cells are replaced by battery modules where each battery module includes multiple battery cells connected in series and/or in parallel. The switching circuit 104 includes switches $S_{11}$ to $S_{mn}$ associated with battery cells $C_{11}$ to $C_{mn}$, respectively. In addition, the switching circuit 104 includes switches $S_1$ to $S_m$ associated with each battery cell in banks 1 to m, respectively. The switches $S_{11}$ to $S_{mn}$ and $S_1$ to $S_m$ control the discharge, charge, and cutoff state of each battery cell $G_{11}$ to $C_{mn}$.

Each switch $S_{11}$ to $S_{mn}$ and $S_1$ to $S_m$ in the switching circuit 104 can be implemented using high-efficiency controllable power semiconductor devices along with the gate drive circuits for the devices. The battery management system 106 can include a controller and additional circuitry that provides the gate control signals for the semiconductor devices included in the switching circuit 104. The battery management system 106 can determine the gate control signals based on the condition of each battery cell or module, the condition determined using real-time data measured at each battery cell or module that is received by the battery management system 106. The switches $S_{11}$ to $S_{mn}$ and $S_1$ to $S_m$ in the switching circuit 104 can control the switching of the battery cells $C_{11}$ to $C_{mn}$, providing the required voltage and current at battery terminals 110a-b to the electrical system.

An external system 108 can be, for example, a bidirectional dc-dc converter that provides an interface between the battery management system 106 and a load and source. The external system 108 can provide input requirements for voltage and current values required for the operation of the electrical system that the battery management system 106 can use for determining how to control the charge and discharge of the cells included in the battery pack 102. In some implementations, nominal voltage and current values for a single battery cell may be limited to several volts and to tens of amperes, which can be much lower than the voltage and current values required by an electrical system in many applications. The power management system 100 includes the battery pack 102 that includes multiple battery cells $C_{11}$ to $C_{mn}$ arranged as a matrix of m×n cells. The battery management system 106 can dynamically configure a number of battery cells in the battery pack 102 using the switching circuit during the operation of the electrical system. The number of battery cells switched in or connected together in the battery pack 102 at a given time can be determined based on the voltage and current value requirements of the external system.

Figure 2:
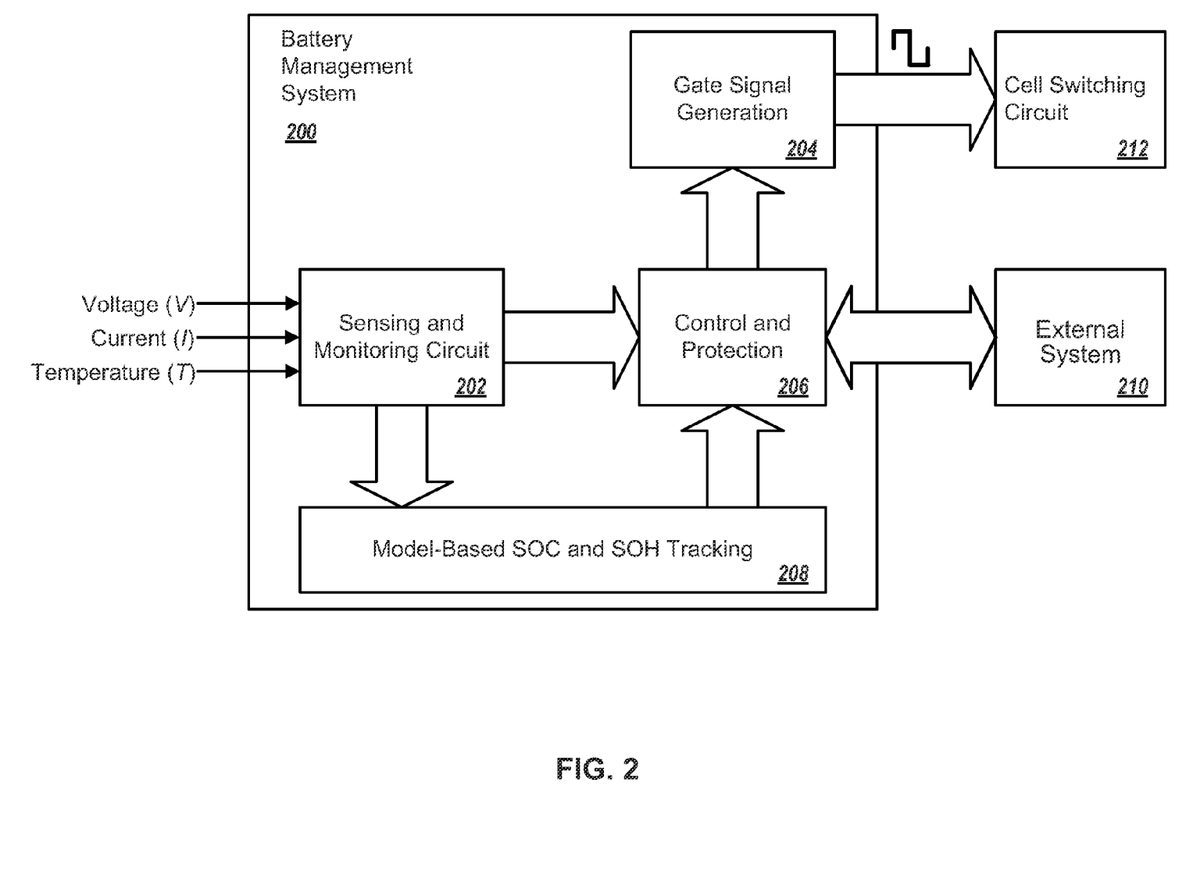
FIG. 2 is a block diagram of an example battery management system for use in a power management system.

FIG. 2 is a block diagram of an example battery management system 200 for use in a power management system. For example, the battery management system 200 can be the battery management system 106 used in the power management system 100 shown in FIG. 1. The battery management system 200 includes a sensing and monitoring circuit 202, a gate signal generation module 204, a control and protection module 206, and a model-based SOC and SOH tracking module 208. In addition, the battery management system 200 interfaces with an external system 210 included in an electrical system that uses a battery and a cell switching circuit 212 for switching the cells included in a battery pack in order to provide the voltage and current values required by the electrical system.

The sensing and monitoring circuit 202 monitors the voltage, current, and temperature values for each battery cell. The control and protection module 206 receives the monitored values for each battery cell. The control and protection module 206 determines, based on the received values for a battery cell, if the battery cell needs protection from an abnormal condition that can include, but is limited to, an overcharge/over-discharge, over-current, or over-temperature condition. If the control and protection module 206 determines that any of these abnormal conditions occur in a battery cell, the control and protection module 206 provides the gate signal generation module 204 with the information needed for the gate signal generation module 204 to generate the control signals needed by a cell switching circuit 212 to cut off, disconnect or "switch-out" the abnormal battery cell from the other battery cells included in the battery pack. The remaining battery cells in the battery pack can still be used to supply and/or store power. This results in the power management system effectively "self-healing" from abnormal conditions or failures of cells in the battery pack.

The model-based SOC and SOH tracking module 208 tracks the SOC and SOH of each battery cell. The model-based SOC and SOH tracking module 208 receives the voltage, current, and temperature values for each battery cell from the sensing and monitoring circuit 202. The model-based SOC and SOH tracking module 208 determines the SOC and SOH of a battery cell based on the received voltage, current, and temperature values for the battery cell. The model-based SOC and SOH tracking module 208 provides the SOC and SOH of the battery cell, respectively, to the control and protection module 206. The control and protection module 206 determines the best cell configuration for the battery pack based on dynamic load/storage demand information received from the external system 210 and the determined SOC and SOH of each battery cell in the battery pack received from the model-based SOC and SOH tracking module 208. The control and protection module 206 identifies a best memory cell configuration that achieves an optimal energy conversion efficiency of the battery pack along with a "self-balancing" of the cells in the battery pack based on cell state variations as indicated by the SOC and SOH of each battery cell. The control and protection module 206 provides information for the best memory cell configuration to the gate signal generation module 204. The gate signal generation module 204 generates appropriate gate control signals and provides the signals to the gate drive circuits of the power semiconductor devices located in the cell switching circuit 212. The gate control signals control the gate drive circuit of each power semiconductor device associated with a respective battery cell, in order to switch the battery cell in or out of use within the battery pack.

Figure 3:
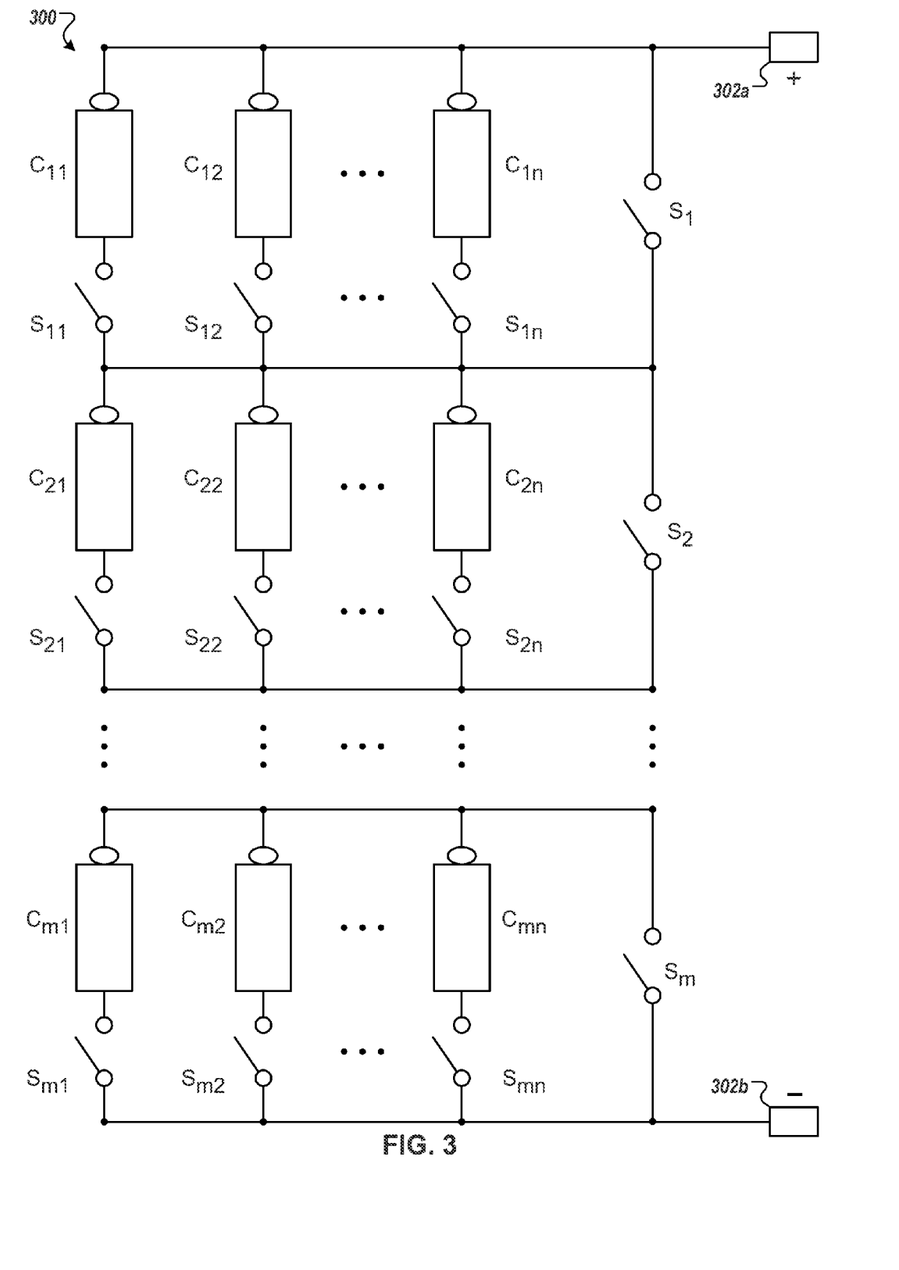
FIG. 3 is a block diagram of an example switching circuit topology for a battery pack.

FIG. 3 is a block diagram of an example switching circuit topology 300 for a battery pack (e.g., the battery pack 102 in FIG. 1). The topology 300 shows a battery pack that includes battery cells $C_{11}$ to $C_{mn}$ arranged as a matrix of m×n cells. The topology 300 also shows switches $S_{11}$ to $S_{mn}$ and switches $S_1$ to $S_m$ that control the discharge, charge, and cutoff state of each battery cell $C_{11}$ to $C_{mn}$.

In the example of FIG. 3, n cells are connected in parallel to form a cell bank that provides higher currents, and m banks are connected in series to step up the voltage at terminals 302a-b of the battery. The cell switching circuit is formed by m×(n+1) controllable switches. Each cell uses one switch (e.g., the switch $S_{ij}$ for battery cell $C_{ij}$, for i=1, . . . , m and j=1, . . . , n), which turns on (closes) or off (opens) to connect or cut off (disconnect) the cell from the battery pack, respectively. In addition, if switch $S_{ij}$ is on (closed), the switch $S_{ij}$ can conduct the current of the respective battery cell $C_{ij}$ in two directions to charge/discharge the cell. Additional switches $S_1$ to $S_m$ are used where a switch $S_i$ (i=1, . . . , m) is off (open) if any of the switches ($S_{i1}$ to $S_{in}$) in bank i is on (closed). If all of the switches in bank i (i=1, . . . , n) are off (opened), then switch $S_i$ should be turned on (closed). Turning switch $S_i$ on (closing switch $S_i$) ensures that the battery cells in lower rows ($S_{(i+1)1}$, . . . , $S_{(i+1)n}$, . . . , $S_{m1}$, . . . , $S_{mn}$) can be connected to supply (discharge) or store (charge) energy through the terminals 302a-b of the battery. The switching circuit topology 300 ensures that each cell in the battery pack can be controlled independently in three modes, i.e., off, on/charge, and on/discharge.

In some implementations, low-cost, high-efficiency power metal-oxide-semiconductor field-effect transistors (MOSFETs) are used to implement the switches in the cell switching circuit. The power MOSFETs can conduct bidirectional currents and have a negligible conduction loss because of their negligible "on" resistance.

Figure 4A:
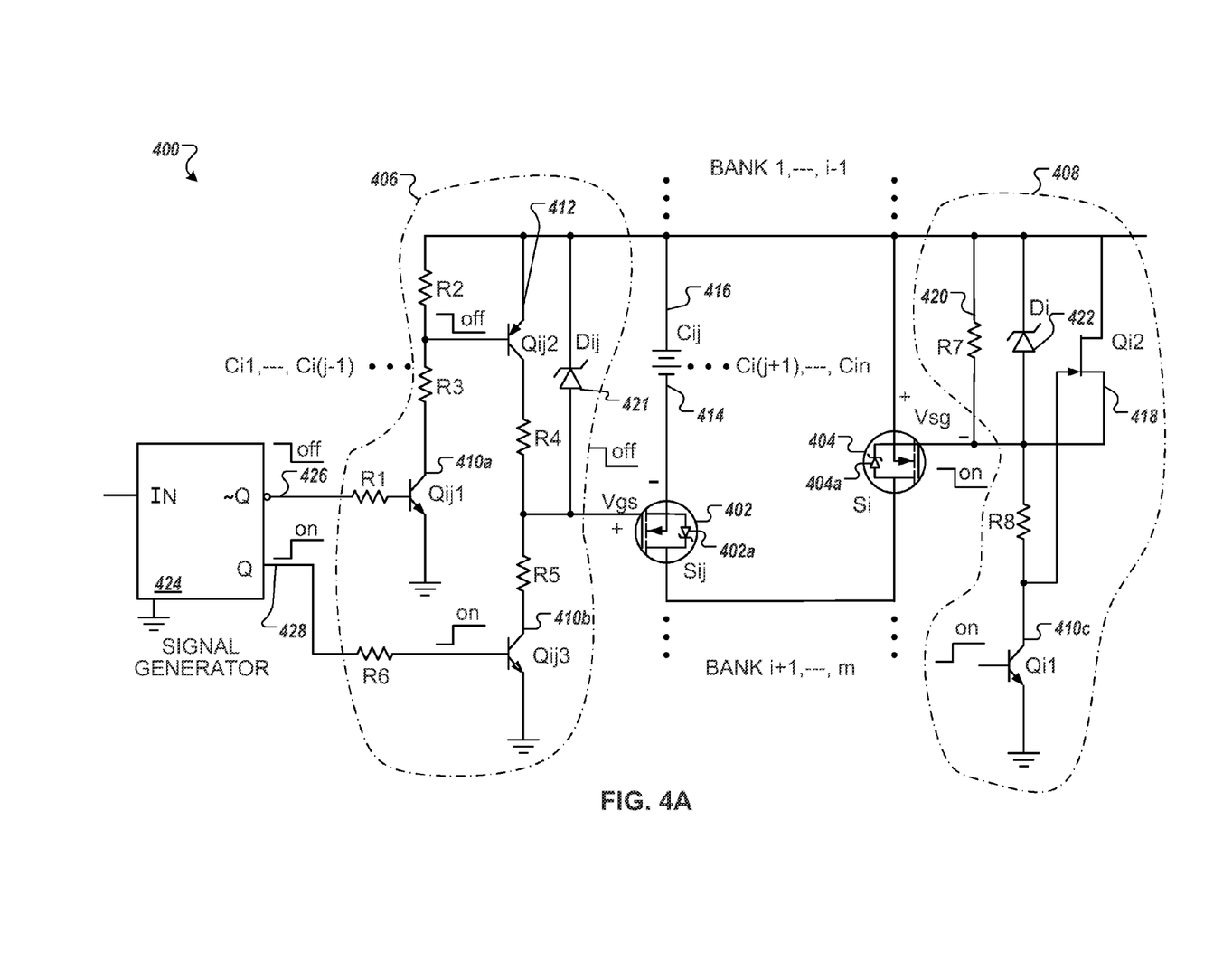
FIG. 4A is a schematic of an example implementation of a switching circuit for a battery cell or module for use in a power management system.

FIG. 4A is a schematic of an example implementation of a switching circuit 400 for a battery cell or module for use in a power management system. Referring to FIG. 3, FIG. 4A shows n-channel power MOSFETs (e.g., MOSFET 402) for use as switches $S_{ij}$ (i=1, . . . , m and j=1, . . . , n) and p-channel power MOSFETs (e.g., MOSFET 404) for use as switches $S_i$ (i=1, . . . , m). Switches $S_{ij}$ (i=1, . . . , m and j=1, . . . , n) use gate drive circuit 406 and switches $S_i$ (i=1, . . . , m) use gate drive circuit 408. Each gate drive circuit 406, 408 uses small signal bipolar junction transistors (BJTs) (e.g., BJTs 410a-c, BJT 412). As shown in FIG. 4A, an anode of a body diode 402a of the MOSFET 402 is connected to a negative terminal 414 of cell $C_{ij}$. This connection can block any unwanted discharges of the cell $C_{ij}$. A cathode of a body diode 404a of MOSFET 404 is connected to a positive terminal 416 of the cell $C_{ij}$. This connection prohibits any unwanted charges of the cell $C_{ij}$, when cell $C_{ij}$ is connected (switch $S_{ij}$ is on (closed)), from flowing through the body diode and into banks i+1, . . . , m.

A signal generator 424 generates signals 426, 428. Signal 426 is applied to the base of BJT 410a and signal 428 is applied to the base of BJT 410b and BJT 410c.

The gate drive circuit 406 uses the voltage of Cell $C_{ij}$ to turn on the n-channel power MOSFET 402, requiring no additional voltage source. When BJT 410a turns on, it drives BJT 412 on, which turns on MOSFET 402 by using the voltage of Cell $C_{ij}$. Turning on MOSFET 402 effectively closes the switch $S_{ij}$. Turning off the MOSFET 402 (opening the switch $S_{ij}$) is accomplished by turning off BJT 410a while turning on BJT 410b, which discharges the parasitic capacitor between the gate and source terminals of MOSFET 402. When BJT 410c turns on, it provides a gate signal to turn on the MOSFET 404 (closing the switch $S_i$). Turning off the MOSFET 404 (opening the switch $S_i$) is accomplished by turning off BJT 410c while turning on junction gate field-effect transistor (JFET) 418. The value of resistor 420 can be chosen to be large enough to ensure that the energy consumption of the gate drive circuit 408 is negligible. A large value for resistor 420 can result in a slow turn-off for MOSFET 404 (a slow opening of switch $S_i$). However, the use of JFET 418 speeds up the turn-off of MOSFET 404 (speeds up the opening of switch $S_i$) when the value of resistor 420 is large. After MOSFET 404 is turned off, JFET 418 is also turned off.

In the implementation of the switching circuit 400, an n-channel MOSFET with a low threshold voltage, $V_{gs}$, (e.g., 1.5 Volts to approximately 2.0 Volts) is used for MOSFET 402 because the voltage of cell $C_{ij}$ is in the range of 3.0 Volts to 4.2 Volts. Two Zener diodes 420, 421, are used to limit the voltage between the source and the gate terminals of MOSFET 402 and MOSFET 404, respectively.

In some implementations, each of the small signal BJTs (BJTs 410a-c, and BJT 412) may be replaced with small-signal MOSFETs.

Figure 4B:
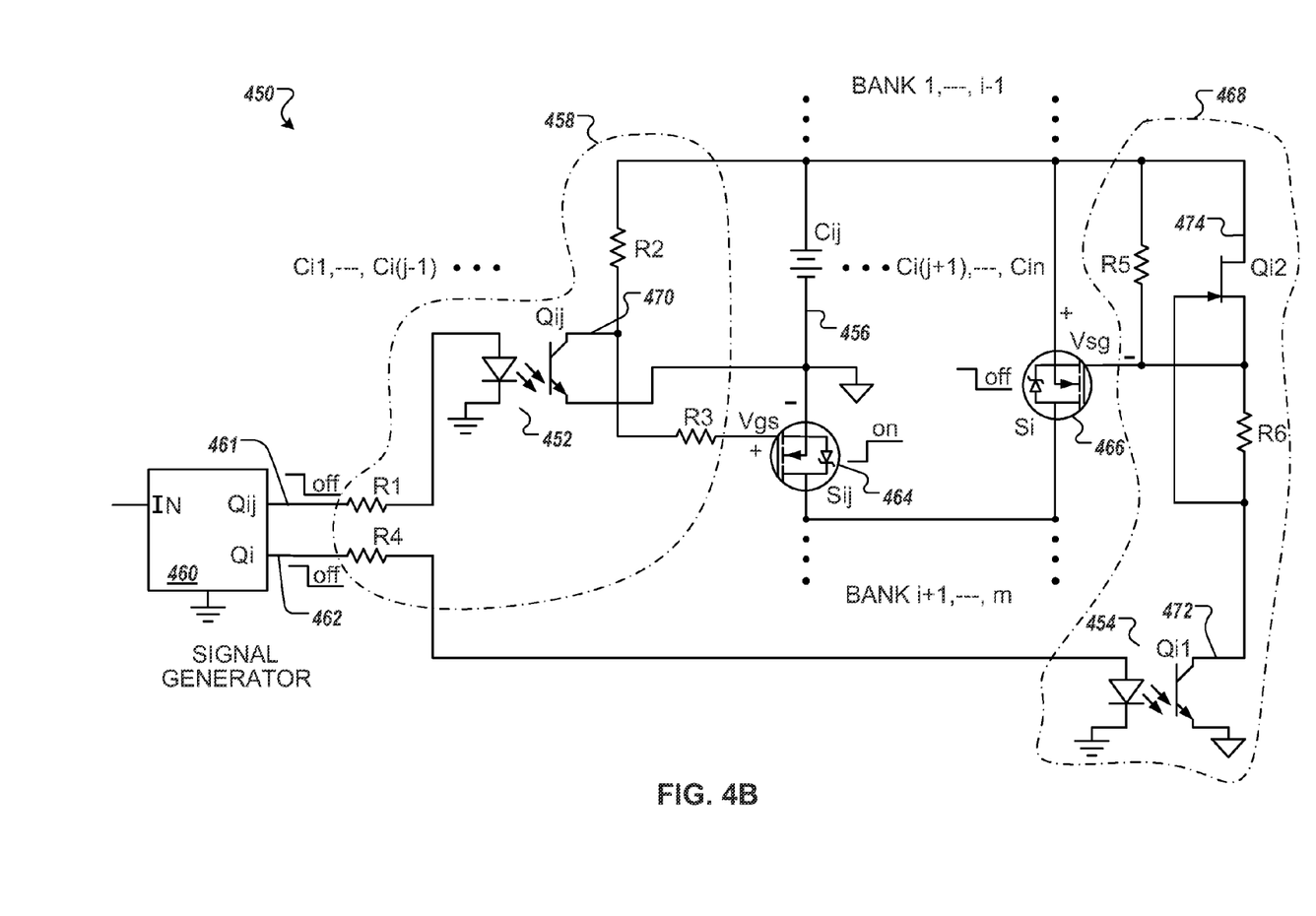
FIG. 4B is a schematic of an alternative example implementation of a switching circuit for a battery cell or module for use in a power management system.

FIG. 4B is a schematic of an alternative example implementation of a switching circuit 450 for a battery cell or module for use in a power management system. Referring to FIG. 4A, opto-couplers 452, 454 are used in place of the BJTs 410a-c, and BJT 412. In the switching circuit 450, a negative terminal 456 of a battery cell $C_{ij}$ is used as the virtual ground for the gate drive circuits 458, 468. A signal generator 460 generates gate signals 461, 462. Gate signals 461, 462 are applied to the gate terminals of power MOSFETs 464, 466 through the corresponding opto-couplers 452, 454, respectively, to drive the power MOSFETs. Because the ground connections of the gate drive circuits 458, 468 and the signal generator 460 are separate from that of the switching circuit 450, the implementation of the switching circuit 450 can be used for multi-cell batteries that operate at any voltage levels. Referring to FIG. 4B, when transistor 470 turns on, it drives MOSFET 464 off (opening the switch $S_{ij}$). When transistor 470 turns off, it drives MOSFET 464 on (closing the switch $S_{ij}$). When transistor 472 turns on, it provides a gate signal to MOSFET 466, turning the MOSFET 466 on (closing the switch $S_i$). When transistor 472 turns off, it turns JFET 474 on and drives MOSFET 466 off (opening the switch $S_{ij}$). After MOSFET 466 is turned off, JFET 474 is also turned off.

Referring to FIGS. 4A and 4B, the small-signal components in the gate drive circuits 406, 408 and the gate drive circuits 458, 468 can be selected to ensure that the energy consumption of the gate drive circuits 406, 408, 458, 468 are negligible compared to the energy flow in the cell. In addition, the small-signal components in the gate drive circuits 406, 408 and the gate drive circuits 458, 468 can be selected to ensure that there is no short circuit between switches $S_{ij}$ and $S_i$ during transient switching periods.

In some implementations, the switching circuits 400, 450 shown in FIGS. 4A and 4B can also be used for cell module level switching, where each cell module includes multiple battery cells connected in parallel and/or series. In these implementations, individual cells in a battery cell pack are included in one or more modules. The battery cell pack and cell switching circuit become a battery cell module pack and a module switching circuit, respectively.

Figure 5A:
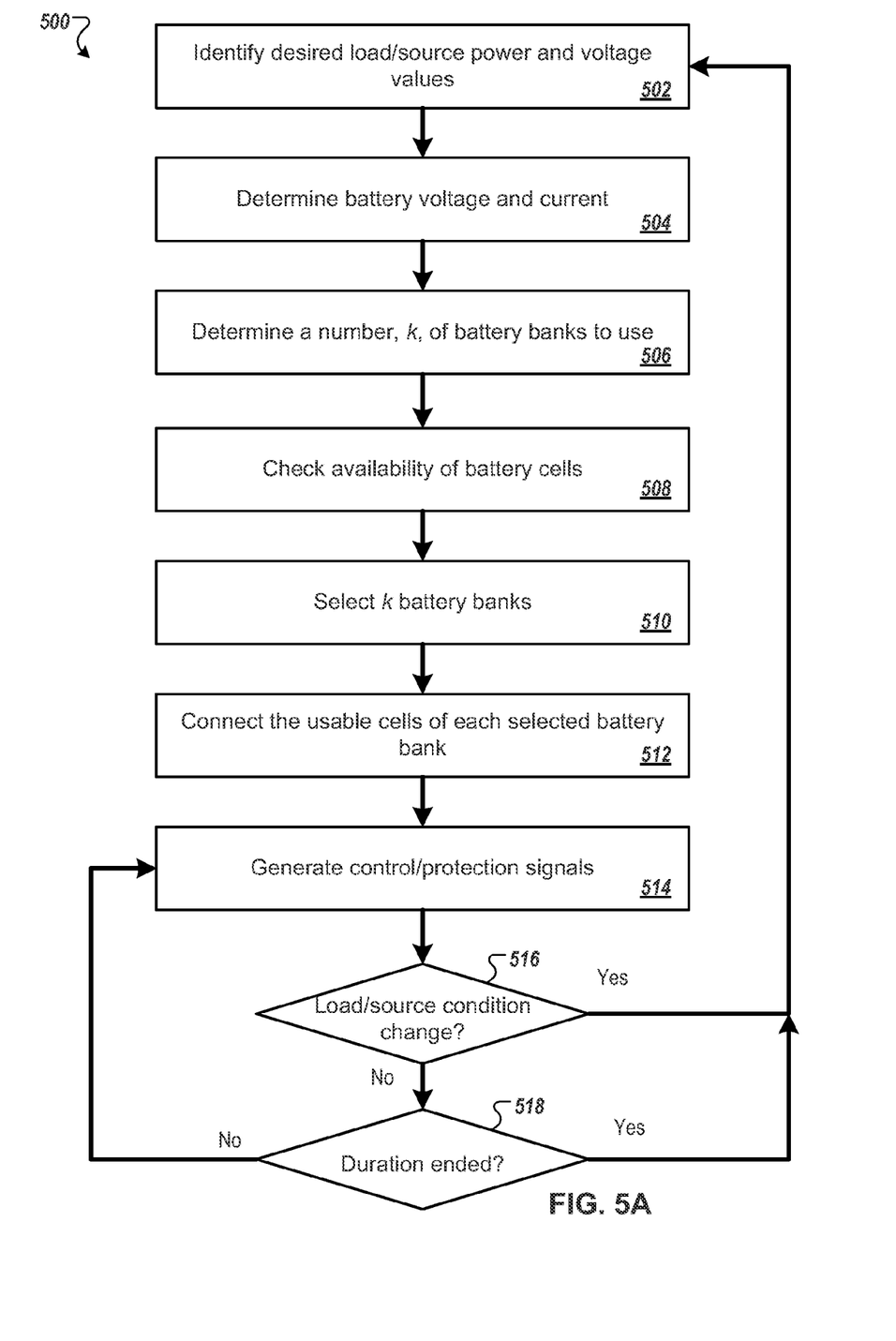
FIG. 5A is a flow diagram illustrating an example process for a control cycle executed by a control and protection module included in a battery management system.

FIG. 5A is a flow diagram illustrating an example process 500 for a control cycle executed by a control and protection module included in a battery management system. For example, referring to FIG. 2, the control and protection module 206 included in the battery management system 200 can execute the process 500.

The control cycle identifies the desired load and source (load/source) power and voltage values and the current condition of each of the battery cells included in a battery pack. The control cycle takes into account if a battery pack is in a self-healing state (self-healing from an abnormal state or failure of one or more battery cells included in the battery pack). The control cycle also takes into account the balancing of the SOCs of the battery cells in the battery pack. Based on this information, the control cycle optimizes the use of the battery cells in the battery pack in order to achieve optimal energy conversion efficiency.

In some implementations, a battery system supplies power to a load at a constant voltage and absorbs power from a constant voltage source. As described in FIG. 1, for example, an external system 108 can be a bidirectional dc-dc converter that provides an interface between the battery management system 106 and a load/source. The bidirectional dc-dc converter can control the charge and discharge of the battery cells included in the battery pack. A power management system (e.g., power management system 100) can be implemented using variable voltages by using k out of m battery banks simultaneously, where m=total number of battery banks and k=1, . . . , m. In some cases, one or more battery banks may be disconnected from the battery pack for self-healing, self-optimization, and self-balancing during operation of the power management system.

The process 500 begins by identifying the desired load/source power and voltage values (502). For example, a control module and protection module (e.g., the control and protection module 206 in FIG. 2) can identify the power demand from the load or the power supplied by the source as $P_d$. The control and protection module can identify the required voltage by the load/source as $V_{req}$. Based on these values, the optimal values of a battery voltage ($V_d$) and a battery current ($I_d$) are determined (504), where $P_d = V_d \times I_d$. The battery can be considered the result of the connection of one or more battery banks included in a battery pack, where each battery bank is the connection of one or more battery cells in parallel. The determination of the optimal values of a battery voltage ($V_d$) and a battery current ($I_d$) can be based on one or more factors. For example, the efficiency of a dc-dc converter can depend on its power and duty cycle (its voltage gain). Based on this factor, the terminal voltage of the battery can be set to a value that allows the dc-dc converter to operate at a voltage gain that leads to a maximum efficiency for the dc-dc converter. In addition or in the alternative, the battery current ($I_d$) can be set to a value that is the smallest possible value that allows the battery to meet the identified load/source power value ($P_d$) while utilizing the rate capacity effect of the battery cells to maximize the energy conversion efficiency of each battery cell included in the battery.

In some implementations, a table can store an optimal operating voltage and current for a battery for each load/source power and voltage condition for the operating range of an external system. For example, referring to FIG. 1, the table can be created offline and stored in memory included in the power management system 100 for the operating range of the external system 108. The power management system can use the table to determine the optimal values of a battery voltage and a battery current based on a real-time operating condition of the external system (i.e., the identified power demand from the load or the power supplied by the source).

A number, k, of battery banks to use is determined (506). For example, a number of battery banks, k, to be connected in a battery pack is determined, where k<=m, and m is equal to the total number of battery banks included in the battery pack. The number of battery banks, k, is determined by dividing the identified required voltage ($V_d$) by the average voltage of each battery bank ($V_{bank}$): $k=V_d/V_{bank}$.

The availability of the battery cells in each battery bank included in the battery pack is checked (508). For example, the control and protection module 206 checks the condition (SOH and SOC) of each battery cell. If a battery cell fails the check (e.g., the battery cell no longer provides any current), is in an abnormal condition (e.g., an overcharge/over-discharge, over-current, or over-temperature condition), its SOH is lower than a predetermined lower limit (e.g., in a mild fault condition), its SOC is lower than a predetermined lower limit (e.g., in a discharge mode), or its SOC is higher than a predetermined upper limit (e.g., in a charge mode), the battery cell is then disconnected from the battery bank and subsequently the battery pack. The battery cells that do not fail the check are considered for use in supplying/storing the identified load/source power.

A number, k, of battery banks is selected (510). In general, a selection process determines a number of usable battery cells to connect in each battery bank and the specific battery banks to connect together for use in supplying/storing the identified load/source power. The selection process will be discussed in more detail with reference to FIG. 5B. The usable cells of each selected battery bank are connected (512). Control/protection signals are generated (514). The control/protection signals are generated if a load/source condition of the external system changes or if a predetermined time duration ($T_d$) is reached.

If it is determined that a load/source condition of the external system has changed (516), the process 500 begins again at step 502 to identify the desired load/source power and voltage values for the external system. If it is determined that a load/source condition of the external system has not changed (516), if it is determined that a time duration ($T_s$) has not ended (518), the process 500 continues to step 512, again generating and checking the control/protection signals. If it is determined, that the time duration ($T_s$) has ended (518), the process 500 begins again at step 502 to identify the desired load/source power and voltage values for the external system.

The process 500 restarts or begins again at step 502 when either the load/source condition of the external system changes or the predefined time duration ($T_s$) ends. This allows for the continual balancing of the SOCs of the battery cells in the battery banks when in both a charge and discharge mode of operation.

In the described implementations of a power management system, the identified healthy battery cells in a selected battery bank can be connected in parallel and used simultaneously to supply/store power. This allows the battery cell voltages to be equal to one another within the battery bank. In some cases, if the battery cells in a battery bank were to have unequal voltages, a power management system can perform battery cell balancing for the battery bank. In a discharge mode, the battery cell balancing can discharge the battery cells sequentially from the battery cell having the highest SOC until the battery cell voltage values for all of the battery cells in the bank become equal. In a charge mode, the battery cell balancing can charge the battery cells sequentially from the battery cell having the lowest SOC until the battery cell voltage values of all the battery cells in the battery bank become equal. For example, referring to FIG. 2, the gate signal generation module 204 can generate the appropriate control signals to control the cell switching circuit 212 based on information it receives from the control and protection module 206.

In some implementations, the time duration ($T_s$) can affect the performance of the battery pack in the power management system. In general, the operating time of a battery increases with a decrease in the time duration ($T_s$). Using a small value for the time duration ($T_s$) can result in frequent switching of the devices included in a cell switching circuit (e.g., the high-efficiency power MOSFETs included in a cell switching circuit (e.g., switching circuit 400 and switching circuit 450 as shown in FIGS. 4A and 4B, respectively). The frequent switching can result in the switching loss of the cell switching circuit.

The selection of the time duration ($T_s$) can be such that the SOCs of all m battery banks included in a battery pack are balanced before any single battery bank is fully charged in a charge mode of operation or before any single battery bank is fully discharged in a discharge mode of operation. The value of the time duration ($T_s$) can be calculated as:

$$T_S = \frac{3600}{I} \times \delta,$$

where $T_s$ is in seconds, I is the normalized battery bank current in coulombs/second, and δ is a percentage. If the SOC of all of the battery banks is above a predetermined low threshold percentage (e.g., 10%) in a discharge mode of operation, or below a predetermined high threshold percentage (e.g., 90%) in a charge mode of operation, a large value for δ (e.g., 5%) is selected. Alternatively, if the SOC of all of the battery banks is below the predetermined low threshold percentage (e.g., 10%) in a discharge mode of operation, or above a predetermined high threshold percentage (e.g., 90%) in a charge mode of operation, a small value for δ (e.g., 0.5%) is selected.

Figure 5B:
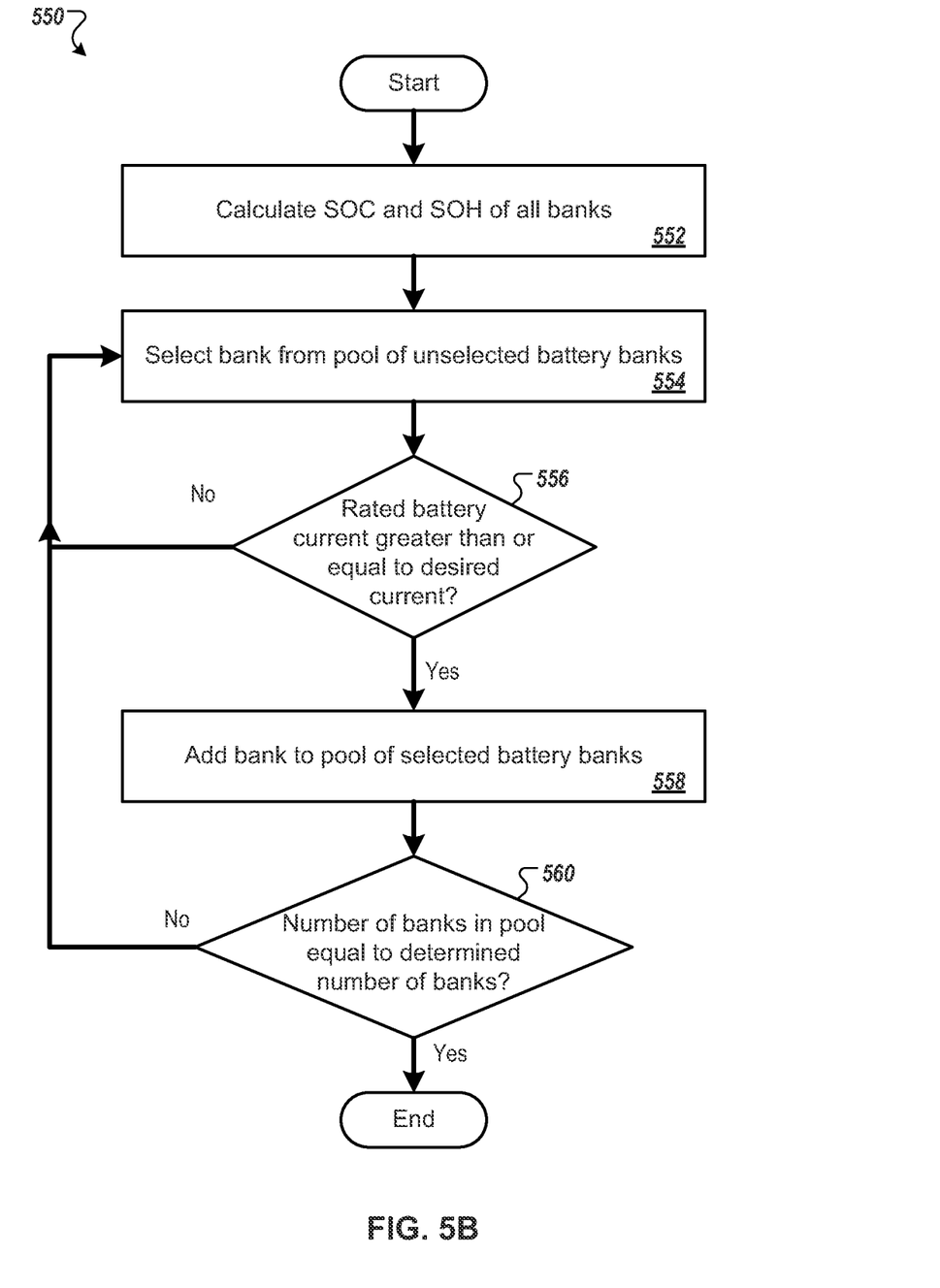
FIG. 5B is a flow diagram illustrating an example process 550 for selecting a number of battery banks for use in a battery pack.

FIG. 5B is a flow diagram illustrating an example process 550 for selecting a number of battery banks for use in a battery pack. For example, referring to FIGS. 5A and 2, the control and protection module 206 included in the battery management system 200 when executing the process 500 and specifically when performing step 510 can execute the process 550.

In order to select a number, k, of battery banks, the process 550 calculates the SOC and SOH of each battery bank included in a battery pack (552). As described with reference to FIG. 5A, if the battery check determines that a cell fails the check, the failed battery cell is considered unusable and is disconnected from the battery bank and subsequently the battery pack. In checking each battery cell, the SOC of each battery cell is calculated. If a battery cell's SOC is lower than a predetermined lower limit (e.g., in a discharge mode), or if a battery cell's SOC is higher than a predetermined upper limit (e.g., in a charge mode), the battery cell is disconnected from the battery. The remaining usable battery cells are considered when calculating the SOC of a battery bank.

The calculated SOCs of the usable battery banks (those battery banks that include at least one usable battery cell) are sorted in a descending numerical order, where the SOC of a battery bank ($SOC_b$) is calculated as:

$$SOC_b = \frac{1}{n}\sum_{i=1}^{n} SOC_i,$$

where $SOC_i$ is the SOC of the $i^{th}$ battery cell in the battery bank. The SOC of a battery cell that is disconnected from the battery bank is set equal to zero.

A battery bank is selected from a pool of unselected battery banks (554). For example, the usable battery banks can be included in a pool of unselected battery banks, where $n_{bp}$ is the number of battery banks included in the unselected pool of battery banks. The number, k, of battery banks to use in order to provide the identified desired load/source power and voltage values to the external system can be selected from the pool of unselected battery banks where $n_{bp}>=k$. For example, the control and protection module can select k banks with the highest SOCs for use by the power management system when the external system is in a discharge mode. In the alternative, for example, the control and protection module can select the k banks with the lowest SOCs for use by the power management system when the external system is in a charge mode. The example process 550 for selecting battery banks can balance the SOCs of the battery banks during the operation of the external system when the battery banks have different SOCs.

It is determined if the rated battery current for a battery bank is less than the desired battery current (556). For example, in order for a battery bank to be considered for selection, the identified desired battery current ($I_d$) must be less than or equal to a rated battery current ($I_{br}$) for the battery bank: $I_d<=I_{br}$, and $I_{br}=n_a \times I_{ar}$, where $n_a$ is the number of usable battery cells in the battery bank and $I_{cr}$ is the rated current of each battery cell included in the battery bank. All of the useable parallel battery cells in each selected battery bank can be used to simultaneously charge/discharge with continuous currents.

If it is determined that the rated battery current for a battery bank is greater than or equal to the desired battery current (556), the battery bank is added to a pool of selected battery banks (558). If it is determined that the rated battery current for a battery bank is less than the desired battery current (556), the process 550 proceeds to step 554 to consider selection of a different battery bank from the pool of unselected battery banks.

If is determined that the number of battery banks in the pool of selected battery banks is equal to the determined number, k, of battery banks needed in order to provide the identified desired load/source power and voltage values to the external system (560), the process 550 ends. If it is determined that the number of battery banks in the pool of selected battery banks is not equal to the determined number, k, of battery banks, the process 550 continues to step 554, selecting a different battery bank from the pool of unselected battery banks for possible addition to the selected pool of battery banks.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations and all of the functional operations described in this specification may be implemented in digital electronic circuitry, or in computer software, firmware, or hardware, including the structures disclosed in this specification and their structural equivalents, or in combinations of one or more of them. Implementations may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A method comprising:
    determining a time duration for repeating a battery balancing cycle based on states-of-charge (SOC) of battery banks in an n×m matrix of battery cells; and
    after the time duration elapses performing battery balancing steps comprising:
        identifying a desired power value and a desired voltage value;
        determining, based on the desired power value and the desired voltage value, a battery voltage value and a battery current value for a battery;
        determining, based on the battery voltage value and the battery current value, a number of battery banks from a plurality of battery banks to use for the battery, wherein each battery bank includes one or more battery cells, and wherein the battery cells are arranged in the n×m matrix of battery cells, the matrix including m banks each comprising n battery cells;
        checking, for each battery bank in the plurality of battery banks, availability of each of the one or more battery cells included in the battery bank;
        selecting one or more battery banks from the plurality of battery banks, wherein:
            the selection of a battery bank is based on the availability of the battery cells included in the battery bank, and
            a quantity of the selected battery banks is equal to the determined number of battery banks; and
        connecting an available battery cells in the selected one or more battery banks to form the battery.

2. The method of claim 1, wherein the desired power value and the desired voltage value are for a load condition, and the method further comprises:
    determining that the load condition has changed; and
    identifying, based on a change in the load condition, an updated desired power value and an updated desired voltage value.

3. The method of claim 1, wherein the desired power value and the desired voltage value are for a source condition, and the method further comprises:
    determining that the source condition has changed; and
    identifying, based on a change in the source condition, an updated desired power value and an updated desired voltage value.

4. The method of claim 1, further comprising:
    determining that a predefined time duration has ended; and
    identifying, based on determining that a predefined time duration has ended, an updated desired power value and an updated desired voltage value.

5. The method of claim 1, wherein selecting one or more battery banks from the plurality of battery banks comprises:
    calculating, for each battery bank in the plurality of battery banks, a state of charge (SOC) and state of health (SOH) of the battery bank;
    determining, based on a calculated SOC and SOH for each battery bank in the plurality of battery banks, a pool of unselected battery banks; and
    selecting a particular battery bank from the pool of unselected battery banks, wherein:
        the battery bank with a highest SOC and SOH is selected as the particular battery bank when the battery is discharged to supply a load, and
        the battery bank with a lowest SOC and SOH is selected as the particular battery bank when the battery is charged from a source.

6. A system comprising:
    a battery management system including one or more processors; and
    a computer-readable medium coupled to the one or more processors having instructions stored thereon which, when executed by the one or more computers, cause the one or more processors to perform operations comprising:

determining a time duration for repeating a battery balancing cycle based on states-of-charge (SOC) of battery banks in an n×m matrix of battery cells; and after the time duration elapses performing battery balancing steps comprising:
identifying a desired power value and a desired voltage value;
determining, based on the desired power value and the desired voltage value, a battery voltage value and a battery current value for a battery;
determining, based on the battery voltage value and the battery current value, a number of battery banks from a plurality of battery banks to use for the battery, wherein each battery bank includes one or more battery cells, and wherein the battery cells are arranged in an n×m matrix of battery cells, the matrix including m banks each comprising n battery cells;
checking, for each battery bank in the plurality of battery banks, availability of each of the one or more battery cells included in the battery bank;
selecting one or more battery banks from the plurality of battery banks, wherein:
the selection of a battery bank is based on the availability of the battery cells included in the battery bank, and
a quantity of the selected battery banks is equal to the determined number of battery banks; and
connecting available battery cells in the selected one or more battery banks to form the battery.

7. The system of claim 6, wherein the desired power value and the desired voltage value are for a load condition, and the operations further comprise:
determining that the load condition has changed; and
identifying, based on a change in the load condition, an updated desired power value and an updated desired voltage value.

8. The system of claim 6, wherein the desired power value and the desired voltage value are for a source condition, and the operations further comprise:
determining that the source condition has changed; and
identifying, based on a change in the source condition, an updated desired power value and an updated desired voltage value.

9. The system of claim 6, wherein the operations further comprise:
determining that a predefined time duration has ended; and
identifying, based on determining that a predefined time duration has ended, an updated desired power value and an updated desired voltage value.

10. The system of claim 6, wherein selecting one or more battery banks from the plurality of battery banks comprises:
calculating, for each battery bank in the plurality of battery banks, a state of charge (SOC) and state of health (SOH) of the battery bank;
determining, based on a calculated SOC and SOH for each battery bank in the plurality of battery banks, a pool of unselected battery banks; and
selecting a particular battery bank from the pool of unselected battery banks, wherein:
the battery bank with a highest SOC and SOH is selected as the particular battery bank when the battery is discharged to supply a load, and
the battery bank with a lowest SOC and SOH is selected as the particular battery bank when the battery is charged from a source.

11. A system for power management of a multi-cell battery, the system comprising:
a battery pack including a plurality of battery cells arranged in an m×n matrix of battery cells, wherein:
n battery cells are connected together to form m battery banks,
the m battery banks are connected together to form the matrix of battery cells, and
m and n are each greater than one;
a cell switching circuit including one or more switches, the cell switching circuit configured to control connecting and disconnecting each of the plurality of battery cells to its respective battery bank, and configured to control connecting and disconnecting each of the m battery banks to the matrix of battery cells; and
a battery management system configured to perform operations comprising:
determining a time duration for repeating a battery balancing cycle based on states-of-charge (SOC) of the m battery banks; and
after the time duration elapses performing battery balancing steps comprising:
determining a battery voltage value based on a desired output power value,
determining, based on the battery voltage value, a number of battery banks from among the m battery banks to use for the battery pack,
selecting one or more battery banks from the m battery banks, and
providing control signals to the cell switching circuit that control the one or more switches included in the cell switching circuit to connect the selected one or more battery banks to provide the desired output power value by the battery pack.

12. The system of claim 11, wherein the operations further comprise checking, for each battery bank in the m battery banks, an availability of each of the n cells of the battery bank, and
wherein selecting the one or more battery banks from the m battery banks comprises:
selecting the one or more battery banks based on the availability of battery cells in the one or more battery banks; and
selecting a quantity of battery banks that is equal to the determined number of battery banks.

13. The system of claim 11, wherein the battery cells are connected in parallel to form each battery bank and the battery banks are connected in series to form the matrix of battery cells.

14. The system of claim 11, wherein the one or more switches included in the cell switching circuit are metal-oxide-semiconductor field-effect transistors (MOSFETs).

15. The system of claim 14, wherein a bipolar junction transistor (BJT) provides a gate signal to a MOSFET to control turning the MOSFET on or off to connect or disconnect, respectively, a battery cell in a battery bank.

16. The system of claim 14, wherein an opto-coupler provides a gate signal to a MOSFET to control turning the MOSFET on or off to connect or disconnect, respectively, a battery cell in a battery bank.

17. The system of claim 11, wherein the battery management system comprises:
a sensing and monitoring circuit configured to monitor current state values for each of the plurality of battery cells;
a control and protection module configured to determine, based on the current state values for each of the plurality of battery cells, that a particular battery cell should be disconnected from a particular battery bank or connected to a particular battery bank for charging or discharging; and a gate signal generation module configured to generate one or more control signals for use by the cell switching circuit when disconnecting the particular battery cell from the particular battery bank or connecting the particular battery cell to the particular battery bank for charging or discharging.

18. The system of claim 17, wherein the battery management system further comprises a model-based state of charge (SOC) and state of health (SOH) tracking module configured to track the SOC and SOH of each of the plurality of battery cells.

19. The system of claim 18, wherein determining that a particular battery cell should be connected to or disconnected from a particular battery bank is based on the SOC and the SOH for the particular battery cell.

20. A system for power management of a multi-cell battery, the system comprising:
a battery pack including a plurality of battery modules arranged in an m×n matrix of battery modules, wherein:
each battery module includes multiple battery cells electrically connected together,
n battery modules are electrically connected together by one or more module switches to form m battery banks,
the m battery banks are electrically connected together by one or more bank switches to form the battery pack, and
m and n are each greater than one;
a cell switching circuit including the module and bank switches, the cell switching circuit configured to control operation of the battery pack by operating one or more of the module or bank switches; and
a battery management system configured to perform operations comprising:
determining a time duration for repeating a battery balancing cycle based on states-of-charge (SOC) of the m battery banks; and
after the time duration elapses performing battery balancing steps comprising:
determining a battery voltage value based on a desired output power value,
determining, based on the battery voltage value, a number of battery banks from among the m battery banks to use for the battery pack,
selecting one or more battery banks from the m battery banks, and
providing control signals to the cell switching circuit that control the one or more switches included in the cell switching circuit to connect the selected one or more battery banks to provide the desired output power value by the battery pack.

21. The system of claim 20, wherein the operations further comprise checking, for each battery bank in the m battery banks, an availability of each of the n cells of the battery bank, and
wherein selecting the one or more battery banks from the m battery banks comprises:
selecting the one or more of the m battery banks based on the availability of respective battery cells in the one or more battery banks; and
selecting a quantity of battery banks that is equal to the determined number of battery banks.

22. The system of claim 20, wherein the battery modules are connected in parallel within the battery banks and the battery banks are connected in series to form the battery pack.

23. The system of claim 20, wherein the module and bank switches included in the cell switching circuit are metal-oxide-semiconductor field-effect transistors (MOSFETs).

24. The system of claim 23, wherein a bipolar junction transistor (BJT) provides a gate signal to a MOSFET to control turning the MOSFET on or off to connect or disconnect, respectively, a battery module in a battery bank.

25. The system of claim 23, wherein an opto-coupler provides a gate signal to a MOSFET to control turning the MOSFET on or off to connect or disconnect, respectively, a battery module in a battery bank.

26. The system of claim 20, wherein the battery management system comprises:
a sensing and monitoring circuit configured to monitor current state values for each of the plurality of battery modules;
a control and protection module configured to determine, based on the current state values for each of the plurality of battery modules, that a particular battery module should be disconnected from a particular battery bank or connected to a particular battery bank for charging or discharging; and
a gate signal generation module configured to generate one or more control signals for use by the cell switching circuit when disconnecting the particular battery module from the particular battery bank or connecting the particular battery module to the particular battery bank for charging or discharging.

27. The system of claim 26, wherein the battery management system further comprises a model-based state of charge (SOC) and state of health (SOH) tracking module configured to track the SOC and SOH of each of the plurality of battery modules.

28. The system of claim 27, wherein determining that a particular battery module should be connected to or disconnected from a particular battery bank is based on the SOC and the SOH for the particular battery module.

* * * * *